April 5, 1966     D. SCARMAMUCCI     3,244,398

COMPOSITE SEAT BALL VALVE

Filed Oct. 28, 1963     3 Sheets-Sheet 1

INVENTOR.
DOMER SCARAMUCCI
BY
Dunlap & Laney
ATTORNEYS

April 5, 1966 D. SCARMAMUCCI 3,244,398
COMPOSITE SEAT BALL VALVE
Filed Oct. 28, 1963 3 Sheets-Sheet 2

INVENTOR.
DOMER SCARAMUCCI
BY
Dunlap & Laney
ATTORNEYS

April 5, 1966 D. SCARMAMUCCI 3,244,398
COMPOSITE SEAT BALL VALVE
Filed Oct. 28, 1963 3 Sheets-Sheet 3

INVENTOR.
DOMER SCARAMUCCI
BY
*Dunlap & Laney*
ATTORNEYS

United States Patent Office 3,244,398
Patented Apr. 5, 1966

3,244,398
COMPOSITE SEAT BALL VALVE
Domer Scaramucci, Box 9125, Oklahoma City, Okla.
Filed Oct. 28, 1963, Ser. No. 319,218
20 Claims. (Cl. 251—148)

This invention relates generally to improved ball valves. More particularly, but not by way of limitation, this invention relates to improved seals useful in ball valves.

In most instances, ball valves manufactured in the past have included a pair of separate seals to prevent leakage between a valve ball and valve body. They have also utilized a separate seal around a ball operating member or stem to prevent leakage between such member and the valve body. When using separate seals between the valve body and valve ball, the valve body must have sufficient length to contain the valve ball and to provide for annular grooves coaxially arranged with respect to a passageway through the valve. The annular grooves are provided to retain the seals and must be carefully aligned and formed to maintain the seals in sealing engagement with the valve ball. Also, due to the spherical configuration of the valve ball, provision must be made for one of the seals to be inserted in the valve after the valve ball is placed in the valve body. Such a procedure necessarily entails the use of some removable means for retaining the seal accurately in place. It should be apparent from the foregoing, that the use of separate seals unduly complicates the ball valve.

It has also been proposed to use a unitary sealing member formed from a resilient material in ball valves. In one form of such a valve, the valve ball is inserted into the sealing member through an opening in one side of the sealing member which forms a part of the flow passageway through the valve, and the sealing member and ball are then placed in a conduit. The sealing member, ball, and conduit have aligned stem openings to receive a ball operating member. No means are provided for sealing around the operating member, except between the sealing member and the interior of the conduit. Therefore, fluids leaking past the seal between the ball valve and sealing member are free to escape through the stem openings in the conduit. One of the most serious disadvantages of such a unitary seal-type valve assembly, is that no provision is made to prevent the ball from being forced through the sealing member, except the engagement of the operating member with the ball. Also, except for the operating member engaging the conduit, no provision is made to prevent the entire valve from being moved through the conduit. Obviously, such a valve structure is limited to relatively low pressure applications because high pressure would cause the operating member to bind in the stem opening in the conduit, making it difficult, if not impossible, to operate the valve.

It is, therefore, one object of the invention to provide an improved ball valve incorporating a unitary seal construction that is simple and economical to manufacture.

Another object of the invention is to provide an improved ball valve incorporating a unitary seal construction wherein fluid-tight seals are formed between the valve ball and valve body and between the valve ball operating member and valve body.

A further object of the invention is to provide an improved ball valve which incorporates reinforcing members in the unitary seal adapting the valve for relatively high pressure use.

Still another object of the invention is to provide an improved reinforced unitary seal that permits insertion and removal of the valve ball.

A further object of the invention is to provide an improved ball valve subassembly incorporating a unitary seal that can be combined with a pair of conduit flange members to form a ball valve assembly.

One aspect of the invention generally contemplates the accomplishment of the foregoing objects by a ball valve including: a valve body adapted to be mounted between pipe or conduit flanges and having a passageway therethrough; a unitary sealing member positioned in the passageway and adapted to form a seal with the pipe flanges; a valve ball receiving chamber in a passageway extending through the sealing member; a valve ball positioned in the chamber and forming a fluid-tight seal with the sealing member; and a valve ball operating member extending through the valve body sealing member forming a fluid-tight seal therewith and operably engaging the valve ball.

The foregoing and additional objects and advantages of the invention will become more apparent as the following description is read in conjunction with the accompanying drawing wherein like reference characters denote like parts in all views and wherein.

Figure 1:
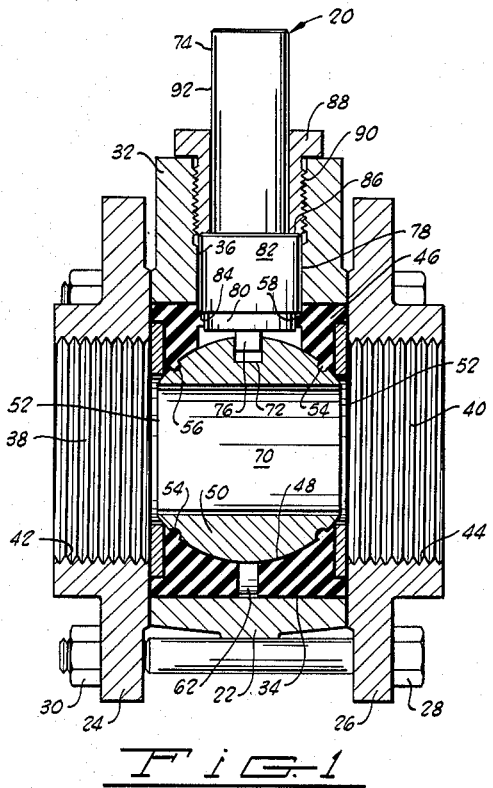
FIGURE 1 is a cross-sectional view of a ball valve assembly constructed in accordance with the invention.

Referring to the drawing and to FIG. 1 in particular, shown therein is a ball valve assembly, designated generally by the reference character 20. As illustrated therein, a valve body 22 is positioned between flange members 24 and 26. A plurality of circumferentially-spaced bolts 28 extend through the flange members 24 and 26. Nuts 30, threaded on the bolts 28, pull the flange members 24 and 26 together applying a compressive force to the valve body 22.

The valve body 22 is generally cylindrical in shape and has a radially extending portion 32 which is constructed in such a manner that it can project between a pair of the bolts 28. A passageway 34 extends through the valve body 22 and an opening 36 extends through the portion 32 intersecting the passageway 34.

The flange members 24 and 26 are provided with passageways 38 and 40, respectively, which are axially aligned with but are smaller in diameter than the passageway 34 for reasons that will be described. The flange members 24 and 26 are adapted for connection with sections of a conduit (not shown), as by the threads 42 and 44 in the passageways 38 and 40.

A sealing member 46 having a generally cylindrical exterior is positioned within the passageway 34 and has an interior chamber 48 adapted to receive a valve ball 50. Openings 52 in each end of the sealing member 46 are axially aligned with the passageway 34 in the body 22, as well as the passageways 38 and 40 in the flanges 24 and 26. A pair of spaced annular beads 54 extend inwardly from the sealing member 46 around the axis of the openings 52 into annular grooves 56 formed in the exterior of the valve ball 50.

Figure 2:
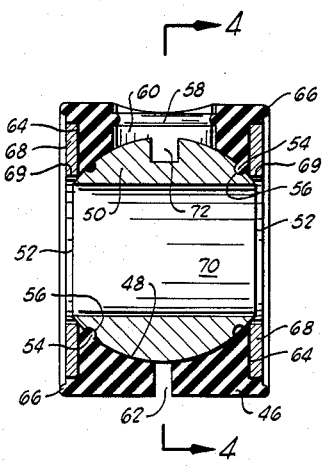
FIGURE 2 is a cross-sectional view of a subassembly including the valve ball and sealing member removed from the assembly of FIG. 1.
Figure 4:
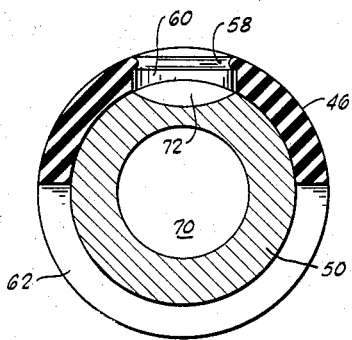
FIGURE 4 is a lateral cross-sectional view of the sealing member and valve ball subassembly taken along the line 4—4 of FIG. 2.

FIG. 2 illustrates more clearly an annular bead 58 formed in the upper portion of the sealing member 46 which extends from the sealing member 46 into a stem opening 60. The opening 60 extends transversely through the wall of the sealing member 46 into the chamber 48. A slot 62, which can best be seen in FIG. 4, extends into the chamber 48 diametrically opposed to the opening 60 in the sealing member 46. As shown, the slot 62 extends transversely through the sealing member 46 and extends vertically slightly more than half the overall height of the sealing member 46. The slot 62 is provided to permit the introduction of the valve ball 50 into the chamber 48 as will be more fully described hereinafter. If desired, the slot 62 can be formed by slitting the sealing member 46 so that no material is actually removed. In this form the sealing member 46 will be essentially solid when located in the valve.

Each end of the sealing member 46 has an annular recess 64 encircling the respective opening 52 and an annular bead 66 (see FIG. 2) projecting outwardly therefrom around the respective annular recess 64. A reinforcing ring 68 is located in each annular recess 64 and has a portion thereof, defined by the intersection of an inwardly facing surface and an inner periphery 69, contiguous with a portion of the exterior of the valve ball 50. Contiguous as used herein is defined as meaning that the reinforcing ring 68 is close to or sometimes touching the surface of the valve ball 50. The beads 66 extend outwardly from the valve body 22 and the reinforcing rings 68 so that the beads 66 sealingly engage and are deformed by the flange members 24 and 26. As shown in FIG. 1, the reinforcing rings 68 are engaged by the flange members 24 and 26, thus providing support for the sealing member 46 and valve ball 50. Reinforcing rings 68 can be completely separate from or bonded to the sealing member 46.

The valve ball 50 has a generally spherical exterior configuration with a passage 70 extending therethrough. As previously indicated, the valve ball 50 is provided with a pair of spaced grooves 56 which are axially aligned with the passage 70. The grooves 56 are not essential to the operation of the valve 20, but are present in the preferred form of the invention as a convenient means of forming the beads 54 as will be described. The grooves 56 may be completely eliminated if desired.

A recess or slot 72 is located in the exterior of the valve ball 50 in such a position that it is in register with the stem opening 60 when the passage 70 has its longitudinal axis in the same plane with the longitudinal axis of the passageways 38 and 40. The recess 72 is generally rectangular in cross-section (see FIG. 1), and is elongated in a direction transverse to the longitudinal axis of the passage 70 (see FIG. 3).

A valve ball operating member or stem 74 extends through the opening 36 in the valve body 22 and the opening 60 in the sealing member 46 and is rotatable therein. A lug portion 76 is formed on a lower end 78 of the stem 74 and extends into the recess 72 in the valve ball 50. The lug portion 76 is also rectangular in cross-section and elongated, conforming generally to the shape of the recess 72. A portion 80 on the lower end 78 of the stem 74 sealingly engages the bead 58 in the opening 60, thereby completing a fluid-tight seal between the stem 74 and valve body 22. An enlarged portion 82 of the stem 74 forms a downwardly facing shoulder 84 and an upwardly facing shoulder 86. The downwardly facing shoulder engages the bear 58 and the upwardly facing shoulder engages a bushing member 88.

The bushing 88 is engaged with the radially extending portion 32 of the valve body 22 by means of mating threads 90 and encircles the upper end 92 of the stem 74. The upper end of the stem 74 can be provided with a handle (not shown) or any suitable means for rotating the stem 74.

FIG. 1 clearly illustrates the position of the various parts of the ball valve 20 when in the open position, i.e., when the passage 70 in the valve ball 50 is aligned with the passageways 38 and 40 in the flange members 24 and 26, respectively. As shown therein, the beads 54 are disposed in the grooves 56 of the valve ball 50. Should fluid under pressure in the valve 20 migrate between the sealing member 46 and valve ball 50 into the stem opening 60 (see FIG. 2), the bead 58 will be forced up against the downwardly facing shoulder 84 on the stem 74. The bead 58, due to the pressure applied, is trapped against the shoulder 84 to augment the seal of the operating member 74 in the valve body 22.

Figure 3:
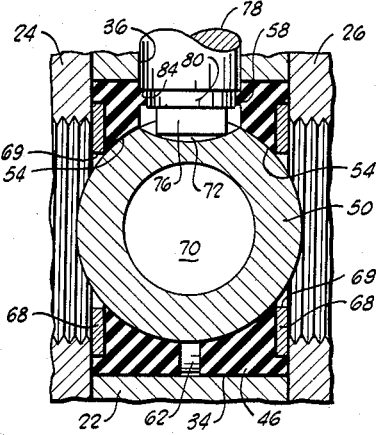
FIGURE 3 is a cross-sectional view of a portion of the assembly of FIG. 1, but showing the valve ball rotated 90°.

When the stem 84 and valve ball 50 are rotated 90° to the closed position as illustrated in FIG. 3, the beads 54 ride out of the grooves 56 and are deformed by the larger diameter of the exterior of the valve ball 50. It is believed that the beads 54 are deformed into the mass of the sealing member 46 and cannot be seen as distinguishable members. The reference characters 54 appearing in FIG. 3 indicate the approximate location of such beads 54, although they are not illustrated as such. Stretching of the beads 54 over the valve ball 50 induces a tensile force in the sealing member 46 around the valve ball 50 which augments the effectiveness of the seal formed between the sealing member 46 and the valve ball 50. The tensile force induced is frequently referred to as "hoop tension."

It can be seen in FIG. 3 that the longer dimension of the lug portion 76 on the stem 74 and the longer dimension of the recess 72 in the valve ball 50 are aligned with the axis of the passageways 38 and 40 in the flange members 24 and 26, respectively, when the valve is closed. With the lug portion 76 and recess 72 in this position, the valve ball 50 can move slightly, independently of the operating member 74, as pressure is applied against one side of the valve ball 50. Such independent movement eliminates cocking of the stem 74 in the opening 36 of the valve body 22, preventing the stem 74 from sticking in the valve body 22.

It should be pointed out that the reinforcing members 68, which are supported by the flange members 24 and 26, restrict the distance through which the valve ball 50 can move. Also, the reinforcing members 68 completely eliminate any possibility of the valve ball 50 being extruded from the sealing member 46 even though some movement is permitted as described.

FIG. 1 illustrates the inclusion of the reinforcing rings 68, but it is important to note that they are not essential to the operation of the ball valve 20. Without the reinforcing rings 68, however, the ball valve 20 will be limited to use in applications involving relatively lower pressures than those that may be safely imposed when the reinforcing rings 68 are used.

Figure 5:
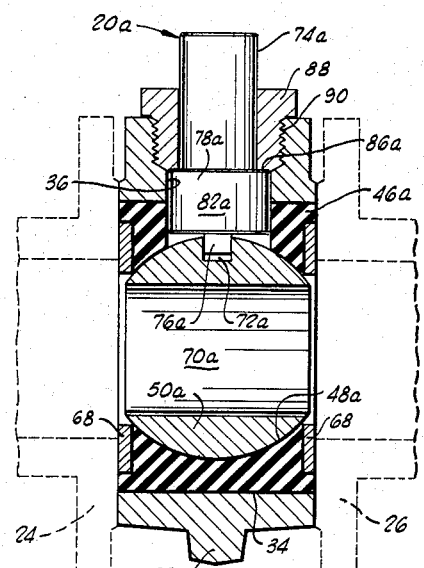
FIGURE 5 is a cross-sectional view of a ball valve subassembly incorporating an alternate arrangement of the valve ball operating member and of the sealing member.

FIG. 5 illustrates a slightly modified ball valve 20a. For convenience and clarity of illustration, the flange members 24 and 26 are shown by dash lines, but it should be understood that they are to be attached as illustrated in FIG. 1. As shown in FIG. 5, a valve ball 50a is rotatably positioned in a ball-receiving chamber 48a of a sealing member 46a. The sealing member 46a is located in the passageway 34 of the valve body 22.

The valve ball 50a is modified to the extent that the annular grooves 56 (see FIG. 1) are not provided.

The passage 70a in the valve ball 50a is substantially identical to the passage 70 in the valve ball 50. Likewise, the recess 72a, which is in register with the stem opening 60a (see FIG. 6) in the sealing member 46a, is substantially identical to the recess 72 in the valve ball 50.

Figure 6:
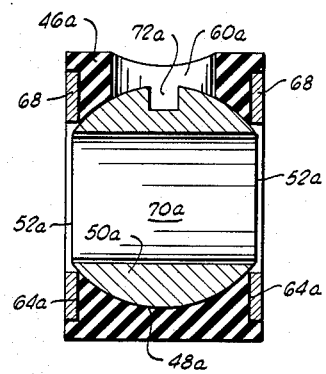
FIGURE 6 is a cross-sectional view of the valve ball and sealing member subassembly of FIG. 5.

Annular reinforcing rings 68 are positioned in annular recesses 64a in the sealing member 46a, as shown in FIG. 6. The annular recesses 64a are axially aligned with and encircle openings 52a which extend into the chamber 48a of the sealing member 46a.

As can be seen in FIG. 5, stem 74a extends through the opening 36 in the valve body 22. The lower end 78a of the stem 74a is provided with a lug portion 76a. The lug portion 76a is identical to the lug portion 76 of the stem 74 and is adapted to be received in the recess 72a of the valve ball 50a. An enlarged portion 82a of the stem 74a provides an upwardly facing shoulder 86a.

The bushing 88, which encircles the stem 74a above the enlarged portion 82a, is retained in the valve body 22 by the mating threads 90. The stem 74a is retained in the valve body 22 by the engagement of the upwardly facing shoulder 86a thereon with the bushing 88. It should also be pointed out that the stem 74a is in sealing engagement with the sealing member 46a because the opening 60a (see FIG. 6) in the sealing member 46a is slightly smaller in diameter than the outside diameter of the enlarged portion 82a on the stem 74a.

The operation of the modified ball valve 20a of FIG. 5 is identical to the operation of the ball valve 20 of FIG. 1, except for the formation of the various fluid-tight seals. The sealing member 46a does not have the annular beads 54, 58, and 66 as did the sealing member 46. Therefore, the fluid-tight seals formed in the ball valve 20a are the result of the engagement of the various parts of the ball valve 20a with the sealing member 46a. For example, the valve ball 50a mounted in the chamber 48a tightly engages the sealing member 46a forming a fluid-tight seal therewith in all operating positions of the valve ball 50a. It can also be observed that the ends of the sealing member 46a extending around the reinforcing rings 68, sealingly engage the flange members 24 and 26. A fluid-tight seal is effected between the stem 74a and the sealing member 46a as previously described.

Figure 7:
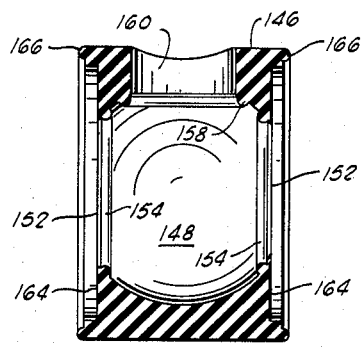
FIGURE 7 is a cross-sectional view of an alternate form of the sealing member.

FIG. 7 illustrates another arrangement of sealing member that can be used in either the ball valve 20 or the modified ball valve 20a. As shown therein, a sealing member 146 has a ball receiving chamber 148 therein and openings 152 in the opposite ends thereof communicating with the chamber 148. Spaced annular beads 154 extend into the chamber 148 from the sealing member 146 coaxially with the openings 152. An annular bead 158 extends into the chamber 148 coaxially with a stem opening 160 which extends transversely into the chamber 148.

Each end of the sealing member 146 has an annular recess 164 encircling the openings 152 and an annular bead 166 projecting outwardly therefrom encircling the annular recess 164. The annular recesses 164 are provided so that the reinforcing rings 68 (see FIG. 2) can be placed therein if desired. The annular beads 166 serve the same purpose as previously described with respect to the beads 66 of FIG. 2.

One main distinction between the sealing members 46 and 146 is in the location of the bead 158 as compared with the location of the bead 58. The bead 158 is arranged to engage the spherical surface of the valve ball 50 (not shown in FIG. 7) forming a seal with the valve ball 50 coaxially with and isolating the opening 160.

It can be observed in FIG. 7 that no slot, such as the slot 62 in the sealing member 46 shown in FIG. 2, is provided in the sealing member 146. The valve ball 50 may be placed in the chamber 148 by either molding the sealing member 146 with the ball 50 in place, or by pressing the ball through one of the openings 152.

Figure 8:
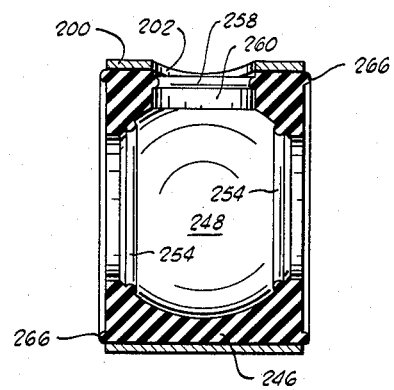
FIGURE 8 is a cross-sectional view of an alternate form of the sealing member having a reinforcing sleeve disposed around the sealing member.

A sealing member 246, shown in FIG. 8, is basically the same as the sealing member 46 which is shown best in FIG. 2. As was true with the sealing member 146 of FIG. 7, no slot is provided in the sealing member 246 for the insertion or removal of the valve ball. The most apparent change from the previously described sealing members is the method used to reinforce the sealing member 246.

A tubular reinforcing sleeve 200 encircles the sealing member 246. The sleeve 200 has a transverse stem opening 202 in register with a stem opening 260 extending transversely through the sealing member 246 into a ball receiving chamber 248.

The sealing member 246 and sleeve 200 are adapted to be inserted into a passageway extending through a valve body, such as the passageway 34 of the valve body 22. Construction of the sleeve 200 from a relatively high strength material will permit the valve body 22 to be substantially reduced in wall thickness because the force resulting from pressure in the valve will be applied to and carried by the reinforcing sleeve 200.

The annular beads 254, 258, and 266 on the sealing member 246 cooperate with the various parts to provide fluid-tight seals as did the beads 54, 58, and 66 on the sealing member 46. The sealing member 246 can be satisfactorily used with either type of stem 74 or 74a. When used with the stem 74a, the bead 258 will be deformed thereby, inducing in the bead 258 tensile forces. Such forces will augment the fluid-tight seal which is formed between the sealing member 246 and the stem 74a in the opening 260.

Figure 9:
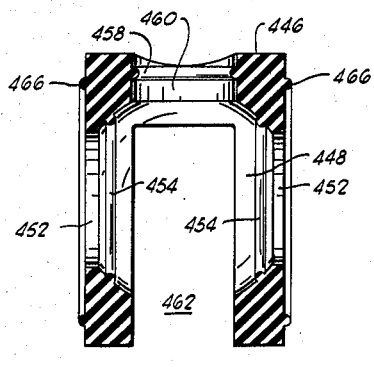
FIGURE 9 is a cross-sectional view illustrating an alternate form of the sealing member.

Sealing member 446 shown in FIG. 9 is provided with annular beads 454, 458, and 466 which are comparable to the beads 54, 58, and 66 of the sealing member 46 shown in FIG. 2. Their function in forming seals with the various valve parts is identical to that described with respect to FIG. 2.

A slot 462 which extends into ball-receiving chamber 448 serves to permit the insertion or removal of a valve ball (not shown). The slot 462 has been greatly enlarged, as compared to the slot 62, for the purpose of diminishing the difficulty that is encountered in passing the valve ball through the slot 462.

Figure 10:
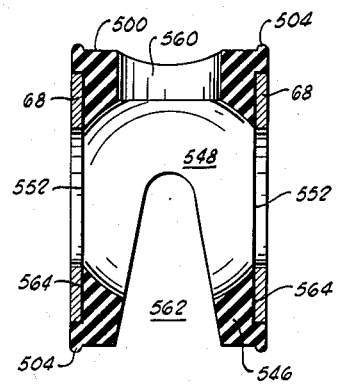
FIGURE 10 is a cross-sectional view illustrating an alternate form of the sealing member.
Figure 11:
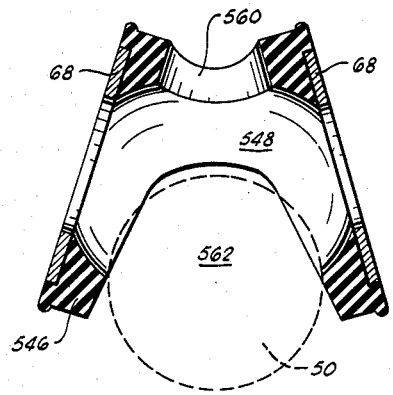
FIGURE 11 is a cross-sectional view of the sealing member of FIG. 10, illustrating the insertion or removal of a valve ball.

FIGURES 10 and 11 illustrate a sealing member 546 having a ball-receiving chamber 548 therein. Reinforcing rings 68 are positioned in the annular recesses 564 which encircle openings 552 in the opposite ends of the sealing member communicating with the chamber 548. Beads 504 project radially from and extend around the periphery 500 of the sealing member 546. As was true with the other sealing members illustrated, the sealing member 546 may be used in a passageway 34 in a valve body 22. Stem opening 560 extending transversely into the chamber 548 is formed in such a shape that the sealing member 546 is preferably used with the stem 74a shown in FIG. 5.

Slot 562, which provides another variation in slot shape, extends into the chamber 548 and is provided to permit the insertion or removal of the valve ball 50 as shown in dash lines in FIG. 11. The slot 562 in its unstressed form is considerably smaller than the ball 50. To insert the ball 50, the slot 562 must be spread until it is at least the diameter of the ball 50.

The various forms of slots illustrated are all provided for the same purpose; i.e., to permit the removal or insertion of the valve ball 50. This is particularly advantageous when the reinforcing rings 68 are bonded to the sealing members. With the rings 68 bonded to the sealing members, the ball 50 cannot be removed in any other manner. It will be necessary from time to time to remove the valve ball 50 in almost any application of the ball valve, but when used with highly corrosive chemicals or highly erosive slurries, the ball 50 will have to be replaced relatively frequently. Considering only the economics involved, the desirability of replacing only the ball 50, instead of the ball and sealing member of the entire ball valve, is obvious.

The various sealing member forms illustrated in the drawings may be manufactured by utilizing the valve ball 50 as the core in the molding process. In such process, a mold (not shown) is formed having a cavity therein which has the same configurations as the interior or passageway 34 of the valve body 22.

When the sealing member 46, shown in FIGS. 1 and 2, is to be molded, (for example) the cavity would have grooves in the ends thereof to form the annular rings 66. The mold cavity used to form the sealing member 146 and 246 shown in FIGS. 7 and 8, respectively, would also have to include the grooves as described.

The ball 50, having the annular grooves 56 therein, as shown in FIG. 1, is then suspended in the mold cavity. Conventional cores are then positioned in the cavity in conjunction with the ball 50 to form the openings 452 (FIG. 9) and the transverse opening 60.

To form the ball inserting and removing slot, a core member having an exterior shape conforming to the shape of the desired slot (62, 462, or 562) is inserted in the mold cavity. Obviously, if the sealing member does not have a slot, for example, the sealing members 46a, 146, or 246, the core member is not used. A release compound suitable to prevent the molding material from sticking to the ball 50 and the cores is then placed on the ball 50, cores, and the interior of the mold cavity if required. After the material has been cured, the ball 50 and sealing member are removed from the mold. The curing process may be any one of several well known processes, but it should result in the shrinking of the seal forming material into tight engagement with the ball 50.

The reinforcing rings 68 (or the sleeve 200) may be placed in the mold cavity with the ball 50 if desired. If the rings 68 are to be bonded to the sealing member, the rings 68 may be covered with a bonding compound to insure the formation of a satisfactory bond. If they are not to be bonded, the release compound may be placed on the rings 68 so that the molding material will not adhere to them. Naturally, the same procedure is applicable to the sleeve 200. The use of the release compound will insure that the seal forming material or molding compound will not adhere to the various parts of the mold, but it should be pointed out that if the molding compound is of the type that will not adhere to smooth metal surfaces, the use of the release compound may be dispensed with.

Examples of suitable molding compound include: Buna-N, Neoprene, natural or synthetic rubber, or any plastic material having satisfactory characteristics.

Due to the resiliency of some of the molding compounds that may be used, the foregoing procedure may be modified wherein the molds utilized may permanently include the cores necessary to form any of the described embodiments. Naturally, when such molds are used, the separate steps of inserting or placing the various cores in the mold are unnecessary.

It is believed that the ball valve of this invention presents many novel features. It is also believed that the ball valve described herein includes improvements in the construction thereof that permit such a valve to be economically manufactured and repaired while at the same time providing a valve that can be utilized in applications wherein relatively high pressures are encountered. The unitary seal member described is effective in eliminating the need for three separate sealing member as is commonly used. The various arrangements of the seal member presented provide an effective seal in virtually any ultimate use that a valve incorporating such seal member may encounter.

The foregoing embodiments are presented by way of example only and it should be understood that many changes and modifications can be made thereto without departing from the spirit of the invention or from the scope of the annexed claims.

What I claim is:
1. A ball valve including:
 a valve body having a cylindrical passageway extending therethrough and a stem opening extending transversely into said passageway;
 a valve ball operably positioned within said passageway and having a passage therethrough adapted to be aligned with the passageway in said valve body;
 an operating stem extending through the stem opening and adapted for coaction with said valve ball;
 a single one-piece sealing member positioned within said valve body and forming fluid-tight seals between said valve body and operating stem and between said valve body and valve ball, said sealing member being generally cylindrical in configuration and having said operating stem extending radially through the cylindrical wall thereof whereby said sealing member cannot turn in said body when said valve ball is turned by said operating stem, said single, one-piece sealing member being dimensioned to permit insertion and removal from the valve body through either of the openings of said passageway extending through said valve body, and said sealing member having opposite end faces lying in generally parallel planes transversely intersecting the passageway through said valve body; and
 metallic reinforcing members on each of said end faces and cooperating with said valve body and valve ball to confine said sealing member and resist extrusion of said seal member into said passageway.

2. A ball valve including:
 a valve body having a passageway extending therethrough and a stem opening extending transversely into said passageway;
 a valve ball operably positioned within said passageway and having a passage therethrough adapted to be aligned with the passageway in said valve body;
 an operating stem extending through the stem opening and adapted for coaction with said valve ball; and
 sealing means positioned within said valve body and including: a resilient seal member forming a fluid-tight seal between said valve body and operating stem and between said valve body and valve ball, and a pair of annular reinforcing members located between said valve body and a portion of said seal member, each of said reinforcing members being axially aligned with said passageway, each of said annular reinforcing members being concentrically disposed with respect to the passage through said valve ball when said valve ball is aligned with the passageway through said valve body, and each being disposed on opposite sides of said resilient seal member from the other and spaced from each other in the direction of fluid flow through said passage, said reinforcing members cooperating with said valve body and said valve ball to confine said resilient seal member and prevent extrusion of said seal member into said passage and passageway.

3. A seal for use in ball valves, comprising:
 a generally cylindrical seal body, said body having:
  a first end;
  a second end spaced from said first end along an axis through said seal body;
  a flow passage extending through said cylindrical body from said first end to said second end along the axis of said cylindrical body;
  a spherical chamber in said seal body intersecting the flow passage through said body for sealingly surrounding and engaging a major portion of a generally spherical valve ball;
  a pair of spaced, annular beads projecting from said seal body into the spherical chamber coaxially with the flow passage through said seal body, said beads lying in planes which extend parallel to each other;

a stem opening extending transversely into said spherical chamber for loosely receiving a valve stem; and an annular bead projecting inwardly from the portion of said seal body defining said stem opening into said stem opening for sealingly engaging valve stems of varying sizes projected through said stem opening, said annular bead being spaced radially outwardly from the portion of said seal body defining the spherical chamber therein.

4. A ball valve sub-assembly including:

a generally cylindrical seal body having a ball receiving chamber therein, and having an inlet and outlet communicating with said ball receiving chamber, said generally cylindrical seal body having a first end and a second end, and having an axis extending between said first and second ends in said cylindrical seal body, said seal body also having a stem opening extending transversely into said chamber in a direction generally normal to the axis of said seal body;

a valve ball disposed in the ball receiving chamber in said seal body in sealing engagement with said seal body and having a passage extending therethrough adapted to be aligned with the inlet and outlet in said seal body; and an annular reinforcing member juxtaposed with each end of said seal body and having a portion contiguous with a portion of the exterior of said valve ball, said annular reinforcing members being concentrically disposed with respect to the passage through said valve ball and positioned adjacent the inlet and outlet of said seal body whereby said reinforcing members cooperate with said valve ball to limit movement of said seal body in a radial direction toward the passage extending through said valve ball.

5. A seal assembly for use in a ball valve, comprising:

a generally cylindrical seal body, said body having a pair of opposed parallel end faces and an axis extending through said cylindrical seal body between said end faces, and further having:
- a flow passage extending axially therethrough;
- a spherical chamber in said body intersecting said flow passage;
- a pair of spaced annular beads projecting from said seal body into said chamber coaxially with said flow passage;
- a stem opening in said body extending transversely into said spherical chamber;
- an annular bead projecting from said seal body into said stem opening, and dimensioned to be resiliently deformed by engagement with valve stems of varying sizes, said annular bead being spaced outwardly on said seal body from the spherical chamber in said seal body;
- an annular bead projecting from each end of said seal body; and an annular reinforcing member adjacent each end of said seal body disposed within the respective annular bead which projects from the respective end of the seal body and having the inner periphery thereof aligned with said flow passage.

6. The seal assembly of claim 5, wherein said reinforcing members are bonded to said seal body; and wherein said seal body has a ball-removing slot extending into said chamber diametrically opposed to said stem opening.

7. A seal assembly for use in a ball valve, comprising:

a generally cylindrical seal body, said body having first and second end faces and an axis extending through said cylindrical body between said end faces, said cylindrical seal body further having:
- a ball-receiving chamber therein;
- an inlet and an outlet in said body communicating with said chamber to form a flow passageway extending axially through said body;
- a stem opening in said body extending transversely into said chamber;
- a ball-removing slot in said body extending into said chamber and diametrically opposed to said stem opening; and an annular reinforcing member bonded to each end face of said body and having the inner periphery thereof aligned with said inlet and outlet, said annular reinforcing members each having a radial width equivalent to more than one-half of the radial width of the end faces of said seal body as measured from the respective inlet and outlet of said seal body to the generally cylindrical peripheral surface thereof whereby said annular reinforcing members can bridge across the inner peripheral wall of tubular flange members used to secure said seal assembly in a rigid ball valve body of larger diameter than said generally cylindrical seal body.

8. A ball valve sub-assembly adapted to be operably positioned between flange members wherein a plurality of bolts extending from one flange member to the other are used to hold the sub-assembly and flange members together, the improvement comprising:

a valve body having a passageway extending therethrough and a stem opening extending transversely into said passageway;

a cylindrical unitary one-piece seal member positioned in said passageway and having a ball-receiving chamber therein and an inlet and outlet forming a flow passageway extending axially through said seal member, said seal member also having a stem opening extending into said chamber in register with the stem opening in said valve body, said seal member projecting from each end of the passageway in said valve body and sealing engaging the flange members when said sub-assembly is assembled therewith;

a valve ball rotatably positioned in said chamber and forming a fluid-tight seal with said seal member, said valve ball having a passage therethrough of substantially the same length as the passageway through said valve body and adapted to be aligned with the inlet and outlet in said seal member and having a recess formed in the periphery thereof in register with the stem opening in said seal member;

an operating stem extending through the stem openings in said seal member and valve body and having one end thereof adapted for coaction with the recess in said valve ball, said operating stem engaging said seal member around said stem opening and forming a fluid-tight seal therewith; and means engageable with said valve body and said operating stem for retaining said operating stem therein.

9. The ball valve sub-assembly of claim 8, wherein said seal member also has an annular recess in each end thereof adjacent the inlet and outlet; and an annular reinforcing member positioned in each annular recess, said reinforcing members having a portion thereof contiguous with a portion of the exterior surface of said valve ball, and said reinforcing members being adapted for supporting engagement with said flange members.

10. The ball valve sub-assembly of claim 9, wherein said reinforcing members are bonded to said seal member; and wherein said seal member has a slot extending transversely into said chamber diametrically opposed to the opening in said seal member, whereby said valve ball can be removed from said chamber through said slot.

11. The ball valve sub-assembly of claim 8, wherein said seal member also has:

a pair of spaced annular bead members extending into said chamber sealingly engaging said valve ball; and an annular bead member extending into the stem opening in said seal member sealingly engaging said operating stem.

12. The ball valve sub-assembly of claim 11, wherein said seal member has an annular bead member extending around the periphery of each end of said member defining an annular recess adjacent the inlet and outlet therein; and characterized further to include:

an annular reinforcing member positioned in each annular recess, each of said reinforcing members having a portion thereof contiguous with a portion of the exterior of said valve ball, and said reinforcing members being adapted for supporting engagement with said flange members.

13. A ball valve sub-assembly including:

a generally cylindrical seal body having first and second ends and a frustospherical ball-receiving chamber therein and having an inlet and an oulet in said ends communicating with said chamber, said seal body also having a stem opening extending transversely into said chamber;

a frusto-spherical valve ball having a first end and a second end disposed in the chamber in said seal body in sealing engagement therewith and having a passage extending therethrough adapted to be aligned with the inlet and outlet in said seal body; and an uninterrupted continuous tubular reinforcing member completely encirculing said seal body and having a transverse stem opening therein in register with the stem opening in said seal body, said stem opening being the only opening in the cylindrical peripheral surface of said tubular reinforcing member whereby said tubular reinforcing member, seal body and valve ball can be rotated to any position for use with connecting elements secured to the inlet and outlet connected to, and communicating with, the passage through said valve ball.

14. A ball valve for use between sections of conduit including:

a pair of flange members, having a passageway therethrough and adapted for connection with the conduit;

a valve body positioned between said flange members and having a passageway therethrough larger than the passageway through said flange members and aligned therewith, and having a stem opening extending transversely into the passageway in said valve body;

means for holding the flange members and valve body in alignment;

sealing means positioned in the passageway in said valve body and having
a ball receiving chamber therein,
an inlet and an outlet aligned with the passageway in said flange members and communicating with said chamber,
a stem opening extending transversely through said sealing means into said chamber and in register with the stem opening in said valve body,
an annular bead extending into the stem opening in said sealing means,
annular beads extending into the chamber coaxially with the inlet and outlet in said sealing means, and
an annular bead extending from each end of said sealing means sealingly engaging said flange members;

a valve ball rotatably positioned in said chamber and in sealing engagement with the annular beads therein said valve ball having a passage extended therethrough adapted to be aligned with the inlet and outlet in said sealing means, said valve ball also having a recess formed in the outer periphery thereof;

an operating stem extending through the stem opening into the valve body and sealing means and sealingly engaging the annular bead on said sealing means in said stem opening, said operating stem having one end thereof operably engaging the recess in said valve ball; and, means engaging said valve body and operating stem to retain said operating stem in said valve body.

15. The ball valve of claim 14, wherein said sealing means also includes an annular reinforcing member adjacent each end of said sealing means in supporting engagement with said flange members, each of said reinforcing members having a portion thereof contiguous with a portion of said valve ball.

16. The ball valve of claim 15, wherein said sealing means also has a slot extending transversely into said chamber diametrically opposed to the opening in said sealing means, and wherein the reinforcing members are bonded to the ends of said sealing means, said slot being adapted to permit the removal of said valve ball from the chamber in said sealing means.

17. A ball valve assembly comprising:

a pair of spaced flange members having circular openings formed therein;

a valve body positioned between said flange members and having a generally cylindrical passageway therethrough of larger diameter than the diameters of the circular openings in said pair of flange members and concentrically aligned with said circular openings;

a generally cylindrical, one-piece, resilient sealing member positioned in the cylindrical passageway through said valve body and having a pair of end faces, said sealing member having its cylindrical outer periphery in contact with said valve body;

a generally spherical member in said sealing member, and said sealing member further having circular openings in each of the end faces thereof communicating with said spherical chamber, the circular openings in said sealing member being of smaller diameter than the circular openings in said pair of flanges and concentrically aligned therewith;

a valve ball positioned within said generally spherical chamber in sealing contact with said sealing member and having a passage extending therethrough in a direction to be aligned with the circular openings in said flanges and in the end faces of said sealing member when said valve ball is rotated;

a valve stem extending through said valve body and said sealing member and coacting with said valve ball to facilitate rotation of said valve ball in said sealing member;

a pair of rigid, annular reinforcing members abutting the end faces of said sealing member and positioned concentrically around the respective circular openings in each of the end faces thereof, said rigid, annular reinforcing members each having a radial width such that its inside diameter is substantially lesser than the diameter of the circular openings in said flange members and its outside diameter is substantially greater than the diameter of the circular openings in said flange members whereby said sealing member is shielded by said reinforcing members from fluid entering the passage in said ball member from the circular opening in one of said flange members, and whereby said reinforcing members distribute compressive forces exerted thereon by said flange members over a substantial portion of said sealing member;

annular beads of resilient material formed integrally with, and forming a part of, said one-piece sealing member and disposed on each end face of said cylindrical sealing member toward the outer periphery thereof for projection therefrom, each of said annular beads being positioned concentrically around said annular reinforcing members and radially outwardly therefrom; and means extending between and interconnecting said flange members to draw said flange members toward each other and into compressive engagement with said annular beads and said rigid reinforcing members.

18. A ball valve comprising:

a valve body having a pair of spaced end faces and having a generally cylindrical passageway extending therethrough from one of the end faces to the other;

a generally cylindrical, one-piece resilient sealing member positioned in said cylindrical passageway and having its entire outer periphery contacting said valve body, said sealing member having a pair of spaced, substantially monoplanar end faces, and having a generally spherically shaped chamber formed centrally therein and circular openings in said end faces opening into said generally spherically shaped chamber, said sealing member and said valve body having aligned stem openings therein and extending at a right angle through the cylindrical sides of said valve body and sealing member into communication with said spherically shaped chamber; and a valve ball positioned in said spherical chamber in sealing contact with that portion of the sealing member which defines said spherical chamber, said valve ball having a pair of spaced ends formed along parallel planes, and a fluid flow passage extending through said valve ball between said spaced ends, said ends projecting through the circular openings in the end faces of said sealing member whereby radially inward movement of said sealing member into said fluid flow passage is prevented by said valve ball, and the sealing surface of said sealing member is protected by said valve ball.

19. A ball valve comprising:

a valve body having two spaced generally parallel end faces and a generally cylindrical passageway extending therethrough from one end face to the other end face;

a one-piece, resilient sealing member in said cylindrical passageway and having a cylindrical outer peripheral surface in sealing contact with a portion of said valve body defining said cylindrical passageway, said sealing member having two spaced, substantially parallel end faces extending normal to said outer peripheral surface and in substantial alignment with the end faces of said valve body, said sealing member further having a generally spherical chamber in the center thereof having circular openings thereinto from the end faces of said sealing member;

a valve ball seated in said spherical chamber and dimensioned to fit snugly and sealingly against the portion of said sealing member defining said spherical chamber and to extend to the openings in the end faces of said sealing member, said valve ball having a fluid flow passage extending diametrically therethrough in a direction facilitating alignment with the openings in said resilient sealing member; and rigid, annular reinforcing members mounted on each of the end faces on said sealing member concentrically around the respective circular openings into said spherical chamber, said reinforcing members each having an inner peripheral edge contiguous to said valve ball and an outer peripheral edge positioned more than halfway from the respective circular opening to the cylindrical outer peripheral surface of said sealing member whereby said sealing member is restrained against radial extrusion by said valve ball, reinforcing members and valve body, 20. A ball valve for use between sections of conduit including:

a pair of flange members having a passageway therethrough and adapted for connection with the conduit;

a valve body positioned between said flange members and having a passageway therethrough larger than the passageway through said flange members and aligned therewith, said valve body having a stem opening extending transversely into the passageway in said valve body;

means for holding the flange members and valve body in alignment;

sealing means positioned in the passageway in said valve body and having
 a ball receiving chamber therein;
 an inlet and an outlet aligned with the passageway in said flange members and communicating with said chamber,
 stem opening extending transversely through said sealing means into said chamber and aligned with the stem opening in said valve body;
 an annular bead extending into the stem opening in said sealing means;
 at least one annular bead extending into the ball receiving chamber and disposed in a plane extending substantially normal to the passageway through said valve body; and
 an annular bead extending from each end of said said sealing means sealingly engaging said flange members;

a valve ball rotatably positioned in said ball receiving chamber in sealing engagement with the annular bead extending into said ball receiving chamber from said sealing means;

an operating stem extending through the stem openings in the valve body and sealing means and sealingly engaging the annular bead on said sealing means in said stem opening, said operating stem engaging said ball valve; and means engaging said valve body and operating stem to retain said operating stem in said valve body.

References Cited by the Examiner

UNITED STATES PATENTS

| | | | |
|---|---|---|---|
| 2,063,699 | 12/1936 | Schellin | 251—317 |
| 2,271,349 | 1/1942 | Saurer | 137—561 X |
| 2,387,013 | 10/1945 | Fuller | 251—368 X |
| 2,751,185 | 1/1956 | Shand | 251—315 X |
| 2,840,102 | 6/1958 | Richter | 137—454.6 |
| 2,845,085 | 7/1958 | Robbins | 137—454.6 |
| 2,864,580 | 10/1958 | Lemoine | 251—317 |
| 2,869,221 | 1/1959 | Siepmann | 29—157.1 |
| 2,890,017 | 6/1959 | Shafer | 251—317 X |
| 2,905,197 | 9/1959 | Janes | 251—317 X |
| 3,041,036 | 6/1962 | McFarland | 251—171 |
| 3,083,725 | 4/1963 | Moen | 137—454.2 |
| 3,100,501 | 8/1963 | Hansen | 137—454.6 |
| 3,101,752 | 8/1963 | Martin | 251—315 X |
| 3,118,465 | 1/1964 | Scaramucci | 137—454.2 |
| 3,124,334 | 3/1964 | Szohatzky | 251—315 X |

FOREIGN PATENTS

| | | |
|---|---|---|
| 149,684 | 1/1953 | Australia. |
| 1,108,974 | 10/1952 | France. |
| 1,256,802 | 2/1961 | France. |
| 1,263,006 | 4/1961 | France. |
| 690,367 | 4/1953 | Great Britain. |
| 931,175 | 7/1963 | Great Britain. |

ISADOR WEIL, *Primary Examiner.*